(12) United States Patent
Taniguchi (10) Patent No.: US 11,962,195 B2
(45) Date of Patent: Apr. 16, 2024

(54) ROTARY ELECTRIC MACHINE

(71) Applicant: DENSO CORPORATION, Kariya (JP)

(72) Inventor: Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 4 days.

(21) Appl. No.: 16/839,465

(22) Filed: Apr. 3, 2020

(65) Prior Publication Data

US 2020/0336032 A1  Oct. 22, 2020

(30) Foreign Application Priority Data

Apr. 19, 2019  (JP) .................. 2019-080498

(51) Int. Cl.
*H02K 1/27* (2022.01)
*H02K 1/16* (2006.01)
*H02K 1/2792* (2022.01)
*H02K 7/00* (2006.01)

(52) U.S. Cl.
CPC ............. *H02K 1/2792* (2022.01); *H02K 1/16* (2013.01); *H02K 7/003* (2013.01)

(58) Field of Classification Search
CPC ........ H02K 1/2786; H02K 1/16; H02K 7/003; H02K 1/14; H02K 3/28; H02K 2213/03; H02K 1/2706; H02K 3/04
See application file for complete search history.

(56) References Cited

U.S. PATENT DOCUMENTS

| 2012/0228981 A1* | 9/2012 | Dajaku | H02K 3/28 310/195 |
| 2015/0061440 A1* | 3/2015 | Catalan | H02K 16/00 310/156.01 |
| 2015/0326080 A1* | 11/2015 | Wakita | H02K 1/2773 310/156.38 |
| 2019/0229573 A1* | 7/2019 | Zhao | H02K 19/10 |
| 2019/0379252 A1* | 12/2019 | Taniguchi | H02K 1/02 |

FOREIGN PATENT DOCUMENTS

JP  2001245460 A  * 9/2001
JP  5905176 B1  4/2016

* cited by examiner

*Primary Examiner* — Thomas Truong (57) ABSTRACT

A rotary electric machine according to the present disclosure provides a rotary electric machine including: a rotor; and a concentrated winding stator arranged coaxially to the rotor, in which the number of teeth of the concentrated winding stator is set to be a value where an integer which is multiple of 3 between adjacent prime numbers in a prime number sequence is multiplied by 2 and the number of poles of the rotor is set to be a value where any prime number between the adjacent prime numbers is multiplied by 2.

9 Claims, 6 Drawing Sheets

| PRIME NUMBER | 5 | | 7 | | 11 | | 13 | | 17 | | 19 | | 23 | | 29 | | 31 |
|---|---|---|---|---|---|---|---|---|---|---|---|---|---|---|---|---|---|
| INTEGER BETWEEN PRIME NUMBERS | 6 | | 9 | | 12 | | 15 | | 18 | | 21 | | 26 | | 30 | | 34 |
| NUMBER OF TEETH | 12s | | 18s | | 24s | | 30s | | 36s | | 42s | | 52s | | 60s | | 68s |
| NUMBER OF POLES | 10p | | 14p | | 22p | | 26p | | 34p | | 38p | | 46P | | 58P | | 62p |
| WINDING PITCH x π | 5/6 | 7/6 | 7/9 | 11/9 | 11/12 | 13/12 | 13/15 | 17/15 | 17/18 | 19/18 | 19/21 | 23/21 | 23/26 | 29/26 | 29/30 | 31/30 | 31/34 |
| SHORT PITCH FACTOR | 0.966 | | 0.94 | | 0.991 | | 0.978 | | 0.996 | | 0.989 | | | | 0.999 | | |
| FUNDAMENTAL NUMBER OF POLES | 8 | | 12 | | 16 | | 20 | | 24 | | 28 | | 34.6 | | 40 | | 45.3 |
| THREE PHASE WINDING IS ACCOMPLISHED | ○ | ○ | ○ | ○ | ○ | ○ | ○ | ○ | ○ | ○ | ○ | ○ | × | × | ○ | ○ | × |

FIG.1A

| PRIME NUMBER | 5 | | 7 | | 11 | | 13 | | 17 | | 19 | | 23 | | 29 | | 31 | |
|---|---|---|---|---|---|---|---|---|---|---|---|---|---|---|---|---|---|---|
| INTEGER BETWEEN PRIME NUMBERS | 6 | | 9 | | 12 | | 15 | | 18 | | 21 | | 26 | | 30 | | 34 | |
| NUMBER OF TEETH | 12s | | 18s | | 24s | | 30s | | 36s | | 42s | | 52s | | 60s | | 68s | |
| NUMBER OF POLES | 10p | | 14p | | 22p | | 26p | | 34p | | 38p | | 46P | | 58P | | 62p | |
| WINDING PITCH × π | 5/6 | 7/6 | 7/9 | 11/9 | 11/12 | 13/12 | 13/15 | 17/15 | 17/18 | 19/18 | 19/21 | 23/21 | 23/26 | 29/26 | 29/30 | 31/30 | 31/34 | |
| SHORT PITCH FACTOR | 0.966 | | 0.94 | | 0.991 | | 0.978 | | 0.996 | | 0.989 | | / | | 0.999 | | / | |
| FUNDAMENTAL NUMBER OF POLES | 8 | | 12 | | 16 | | 20 | | 24 | | 28 | | 34.6 | | 40 | | 45.3 | |
| THREE PHASE WINDING IS ACCOMPLISHED | ○ | ○ | ○ | ○ | ○ | ○ | ○ | ○ | ○ | ○ | ○ | ○ | × | × | ○ | ○ | × | |

FIG.1B

| PRIME NUMBER | 37 | | 41 | | 43 | | 47 | | 53 | | 59 | | 61 | | 67 | | 71 | |
|---|---|---|---|---|---|---|---|---|---|---|---|---|---|---|---|---|---|---|
| INTEGER BETWEEN PRIME NUMBERS | 34 | | 39 | | 42 | | 45 | | 50 | | 56 | | 60 | | 64 | | 69 | | 72 |
| NUMBER OF TEETH | 68s | | 78s | | 84s | | 90s | | 100s | | 112s | | 120s | | 128s | | 138s | | 144s |
| NUMBER OF POLES | 74p | | 82p | | 86p | | 94p | | 106p | | 118p | | 122P | | 134p | | 142p | |
| WINDING PITCH × π | 37/34 | 37/39 | 41/39 | 41/42 | 43/42 | 43/45 | 47/45 | 47/50 | 53/50 | 53/56 | 59/56 | 59/60 | 61/60 | 61/64 | 67/64 | 67/69 | 71/69 | 71/72 |
| SHORT PITCH FACTOR | / | | 0.997 | | 0.999 | | 0.998 | | / | | / | | 0.999 | | / | | 0.999 | 0.999 |
| FUNDAMENTAL NUMBER OF POLES | 45.3 | | 52 | | 56 | | 60 | | 66.6 | | 74.6 | | 80 | | 85.3 | | 92 | | 96 |
| THREE PHASE WINDING IS ACCOMPLISHED | × | ○ | ○ | ○ | ○ | ○ | ○ | × | × | × | × | ○ | ○ | × | × | ○ | ○ | ○ |

FIG.1C

| PRIME NUMBER | 73 | | 79 | | 83 | | 89 | | 97 | | 101 | | 103 | | 107 | | 109 | |
|---|---|---|---|---|---|---|---|---|---|---|---|---|---|---|---|---|---|---|
| INTEGER BETWEEN PRIME NUMBERS | 72 | | 76 | | 81 | | 86 | | 93 | | 99 | | 102 | | 105 | | 108 | | 111 |
| NUMBER OF TEETH | 144s | | 152s | | 162s | | 172s | | 186s | | 198s | | 204s | | 210s | | 216s | | 222s |
| NUMBER OF POLES | 146p | | 158p | | 166p | | 178p | | 194p | | 202p | | 206P | | 214p | | 218p | |
| WINDING PITCH × π | 73/72 | 73/76 | 79/76 | 79/81 | 83/81 | 83/86 | 89/86 | 89/93 | 97/93 | 97/99 | 101/99 | 101/102 | 103/102 | 103/105 | 107/105 | 107/108 | 109/108 | 109/111 |
| SHORT PITCH FACTOR | 0.999 | | / | | 0.999 | | / | | 0.998 | | 0.999 | | 1.0 | | 0.999 | | 1.0 | 1.0 |
| FUNDAMENTAL NUMBER OF POLES | 96 | | 25.3 | | 108 | | 114.6 | | 124 | | 132 | | 136 | | 140 | | 144 | | 148 |
| THREE PHASE WINDING IS ACCOMPLISHED | ○ | × | × | ○ | ○ | × | × | ○ | ○ | ○ | ○ | ○ | ○ | ○ | ○ | ○ | ○ | ○ |

FIG.2A

| NUMBER OF TEETH | NUMBER OF POLES |
|---|---|
| 18 | 18±4 |
| 30 | 30±4 |
| 42 | 42±4 |
| 78 | 78±4 |
| 90 | 90±4 |
| 138 | 138±4 |
| : | : |

FIG.2B

| NUMBER OF TEETH | NUMBER OF POLES |
|---|---|
| 24 | 24±2 |
| 36 | 36±2 |
| 60 | 60±2 |
| 84 | 84±2 |
| 120 | 120±2 |
| : | : |

| TOOTH NUMBER | PHASE |
|---|---|
| 1 | U |
| 2 | −U |
| 3 | U |
| 4 | −W |
| 5 | W |
| 6 | −W |
| 7 | V |
| 8 | −V |
| 9 | V |
| 10 | −U |
| 11 | U |
| 12 | −U |
| 13 | W |
| 14 | −W |
| 15 | W |
| 16 | −V |
| 17 | V |
| 18 | −V |

| TOOTH NUMBER | PHASE |
|---|---|
| 19 | U |
| 20 | −U |
| 21 | U |
| 22 | −W |
| 23 | W |
| 24 | −W |
| 25 | V |
| 26 | −V |
| 27 | V |
| 28 | −U |
| 29 | U |
| 30 | −U |
| 31 | W |
| 32 | −W |
| 33 | W |
| 34 | −V |
| 35 | V |
| 36 | −V |

ROTARY ELECTRIC MACHINE

CROSS-REFERENCE TO RELATED APPLICATION

This application is based on and claims the benefit of priority from earlier Japanese Patent Application No. 2019-080498 filed Apr. 19, 2019, the description of which is incorporated herein by reference.

BACKGROUND

Technical Field

The present disclosure relates to a rotary electric machine for a vehicle or an aircraft which requires a large torque in a low speed range.

Description of the Related Art

A rotary electric machine has been used for a vehicle or an aircraft. Generally, the winding system of a rotary electric machine includes a full pitch winding in which the winding pitch is the same as the pole pitch n (radian), a short pitch winding in which the winding pitch is shorter than the pole pitch and a long pitch winding in which the winding pitch is longer than the pole pitch.

SUMMARY

The present disclosure has been achieved in light of the above-described circumstances and provides a rotary electric machine having an optimized combination of the number of poles and the number of teeth in accordance with a constant rule which have been found between the number of poles and the number of teeth.

The rotary electric machine according to the present disclosure provides a rotary electric machine (100) including: a rotor; and a concentrated winding stator arranged coaxially to the rotor.

The number of teeth of the concentrated winding stator is set to be a value where an integer which is multiple of 3 between adjacent prime numbers in a prime number sequence is multiplied by 2 and the number of poles of the rotor is set to be a value where any prime number between the adjacent prime numbers is multiplied by 2.

According to such a structure, without trial-and-error methods, a rotary electric machine having an optimized combination of the number of poles and teeth can be obtained in accordance with a constant rule which has been found between the number of poles and the number of teeth.

DETAILED DESCRIPTION OF THE PREFERRED EMBODIMENTS

According to a conventional rotary electric machine, recently, for the short pitch winding, a concentrated winding is often utilized for connecting the stator windings in designing/manufacturing the rotary electric machine. This is because, in the full pitch winding, a winding for a portion unable to be accommodated in the stator core, that is, forming so called coil end, becomes complicated. As a result, although the total length of the stator including the coil end becomes large, concentrated winding is utilized for the short pitch winding, whereby the coil end can be designed simply.

However, with the concentrated winding, it is known that since the winding pitch is not the full pitch range, the short pitch factor is lowered, thereby degrading the performance of the rotary electric machine. For example, the short pitch factor for ordinal 8 poles 12 slots of stator is 0.866. This means that the actual output torque decreases to 0.866 when assuming the ideal value of the output torque of the rotary electric machine is 1.

In order to reduce the degradation of the output torque of the rotary electric machine, it has been known that the winding pitch is set to be $(6\pm1)/6\pi$ and the configuration of the rotor and the stator is designed as 10 poles and 12 teeth or 14 poles and 12 teeth.

For example, Japanese Patent Number 5905176 discloses an invention of a rotary electric machine in which the winding pitch is set to be $(9\pm2)/9\pi$ and the configuration of the rotor and the stator is designed as 14 poles and 18 teeth.

According to the above-described rotary electric machine of the above-described patent literature, the above-described number of poles and teeth are utilized to improve the output torque of the rotary electric machine and suppress vibration and noise caused by the rotary electric machine. In this respect, how to determine the above-described number of poles and teeth is important.

For example, a trial and error process is continuously performed for various combinations of the number of poles and teeth so as determine the combination of the number of poles and teeth which satisfies a required efficiency of the rotary electric machine. The trial and error process requires a lot of time, a large cost and is labor-intensive.

Hereinafter, with reference to the drawings, embodiments of the present disclosure will be described. A rotary electric machine according to the present embodiment is utilized for a motive force of a vehicle or an aircraft which requires a large torque in a low speed range.

Conventionally, no rule has been found between the number of poles and the number of teeth in the rotary electric machine. However, the inventor has discovered, during a development of the rotary electric machine according to the present embodiment, the following constant rule is present between the number of poles and the number of teeth in a specific concentrated winding. The present embodiment provides a motor and a generator as a rotary electric machine designed in accordance with the following rule. Moreover, specification is clarified in order to effectively enhance the design of the rotary electric machine and the generator.

The constant rule present between the number of poles and the number of teeth is defined such that the number of teeth of the concentrated winding stator arranged coaxially to the rotor is set to be a value where an integer S which is a multiple of 3 between adjacent prime numbers (P1, P2, P1<P2) in a prime number group is multiplied by 2 (2S=P1+P2), and the number of poles of the rotor is set to be a value where any prime number between the adjacent prime numbers (P1, P2) is multiplied by 2 (2P1, 2P2).

Figure 1A:
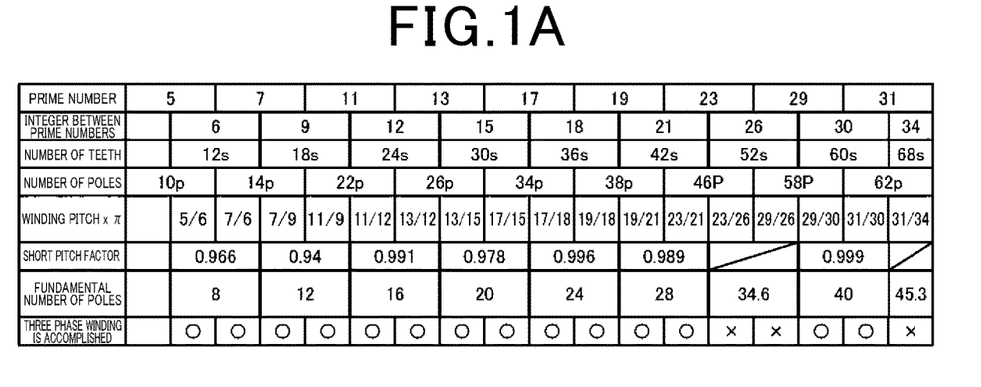
FIGS. 1A, 1B and 1C are tables each showing an example of the number of poles and teeth determined in accordance with a constant rule based on prime number sequence in a rotary electric machine according to the present embodiment of the present disclosure.
Figure 1B:
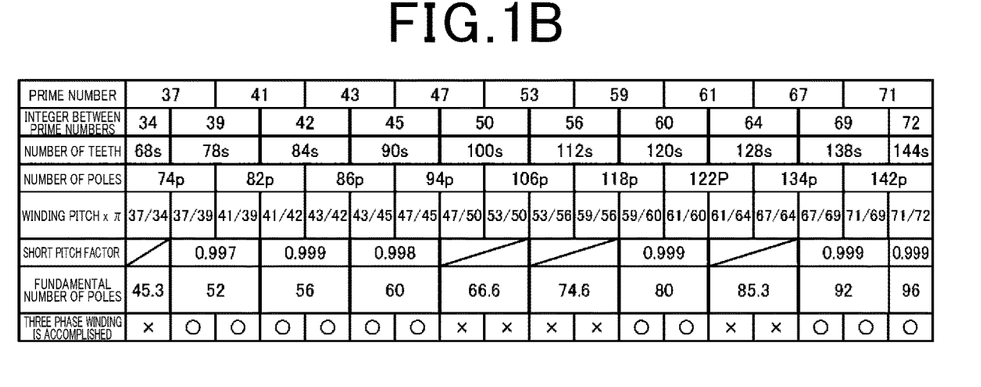
Figure 1C:
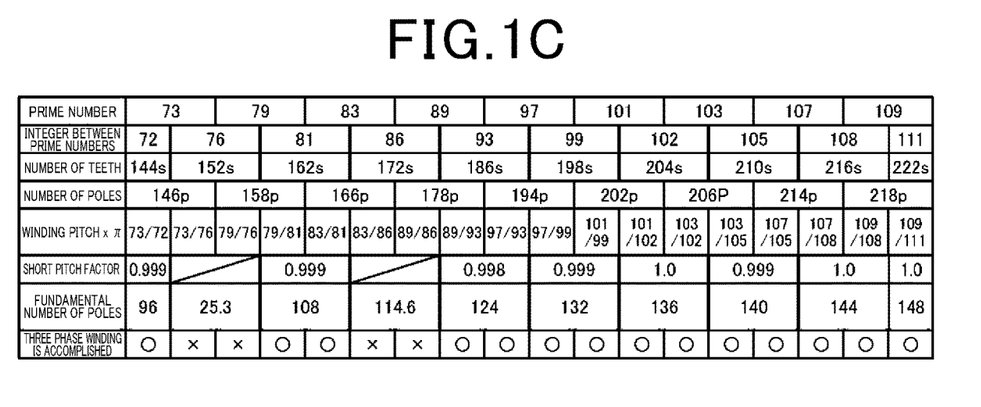

The above-described design rule will be described in detail with reference to FIGS. 1A, 1B and 1C. Each of FIGS. 1A, 1B and 1C shows prime numbers arranged in ascending order at the first row. At the second row, an intermediate value ((P1+P2)/2) of adjacent prime numbers (P1, P2). For example, the intermediate value of the prime numbers 11 and 13 is 12. The third row shows values where numbers in the second row are each multiplied by 2, which are the numbers of teeth of the stator in the rotary electric machine according to the present embodiment. At the fourth row, values where prime numbers in the first row are multiplied by 2 are shown, which are the values representing the number of poles of the rotary electric machine according to the present embodiment. Accordingly, when assuming that the first column of the table 1 is blank, the combination in the second column represents a stator winding having 10 poles and 12 teeth. Similarly, the combination in the third column represents the stator winding having 14 poles and 12 teeth, the combination in the sixth column represents a stator winding having 22 poles and 24 teeth, and the combination in the seventh column represents a stator winding having 26 poles and 24 teeth.

Note that the combinations in the first to sixth columns shown in FIG. 1A (i.e. 10 poles, 12 teeth to 22 poles and 24 teeth) are already known, excluding the combinations in the seventh column and latter one.

In each of FIGS. 1A, 1B and 1C, at the fifth row, a winding pitch, that is, an electrical angle of adjacent one teeth is shown. When assuming that 2/3 n or 4/3 n appears in the integer multiple of the winding pitch, it means that a symmetrical three phase windings is accomplished. The eighth row in each of FIGS. 1A, 1b and 1C illustrates a determination whether the symmetrical three phase winding is accomplished by using symbols 'o' (accomplished) or 'x' (not accomplished).

For example, 26 poles and 30 teeth in the eighth column has 13/15n teeth pitch between adjacent teeth, and the 11th teeth with respect to the first teeth has 130/15n teeth pitch (10 times the winding pitch), that is, (8+2/3) n. Similarly, 21st teeth has 260/15n (20 times of the winding pitch), that is, (16+4/3) n.

Accordingly, 2/3n and 4/3n for the 11th teeth and the 21st teeth refers to a symmetrical three phase winding being accomplished. That is, teeth at any position corresponding to a mechanical angle of 120 degrees or 240 degrees are assigned to either electrical angle 120 degrees or 240 degrees. The rule whether 2/3n or 4/3n appears in the value of integer multiple of the winding pitch can be applied to winding pitch in combinations of the number of poles or teeth other than the above-described combinations.

However, in the case where the above-described rule is applied to a combination of 46 poles and 52 teeth shown in 14th column of FIG. 1A, the interval between adjacent teeth for the 46 poles and 52 teeth is 23/26n, and a teeth including a value which is the closest to 4/3n among the integer multiple of the winding pitch is the eighth teeth. Seven times 23/26n equals 161/26n and the result is (5+31/26) n. Moreover, 31/26n is 1.19 radian, which is smaller than 4/3n, that is, 1.33n radian. Hence, according to the above-described combination, symmetrical three phase windings cannot be accomplished. Similarly, 58 poles and 52 teeth in the 15th column cannot be a suitable three phase winding.

A condition that can provide symmetrical three phase winding with combinations with respect to the prime numbers shown in each of FIGS. 1A, 1B and 1C, is that values shown in the second row, that is, intermediate values between adjacent prime numbers, are multiples of three.

In each sixth row of FIGS. 1A, 1B and 1C, the short pitch factor of the winding in accordance with the number of poles and the number of teeth is shown. In FIGS. 1A, 1B and 1C, it is found that the short pitch factor becomes closer to 1 as the number of poles becomes larger, and becomes approximately 0.999 when the number of poles exceeds 80.

The fact that the short pitch factor becomes closer to 1 as the number of poles becomes larger indicates that the number of poles of the one having large diameter and flat shape may preferably be 80 or more for a rotary electric machine that requires a large torque at low speed range. In particular, when the outer diameter of the magnetic circuit exceeds 200, a rotary electric machine having a large number of poles can relatively readily be designed and manufactured. According to the rotary electric machine of the present disclosure, an electromagnetic size is expected to be 200 φ or more. More specifically, the rotary electric machine of the present disclosure is an inner rotor type rotary electric machine in which the outer diameter of the stator core is 200 φ or more, or an outer rotor type rotary electric machine in which the outer diameter of the rotor is 200 φ or more. Further, it may be an axial gap type rotary electric machine in which the outer diameter of the stator core is 200 φ or more.

In each seventh row of FIGS. 1A, 1B and 1C, the number of poles is shown as a reference so as to provide the number of teeth shown in the third row with a basic 2-3 system winding (integer multiple of 2 poles and 3 teeth). In the case where a symmetrical three phase winding is accomplished, it is significant that the value in the seventh row becomes an integer number.

Figure 2A:
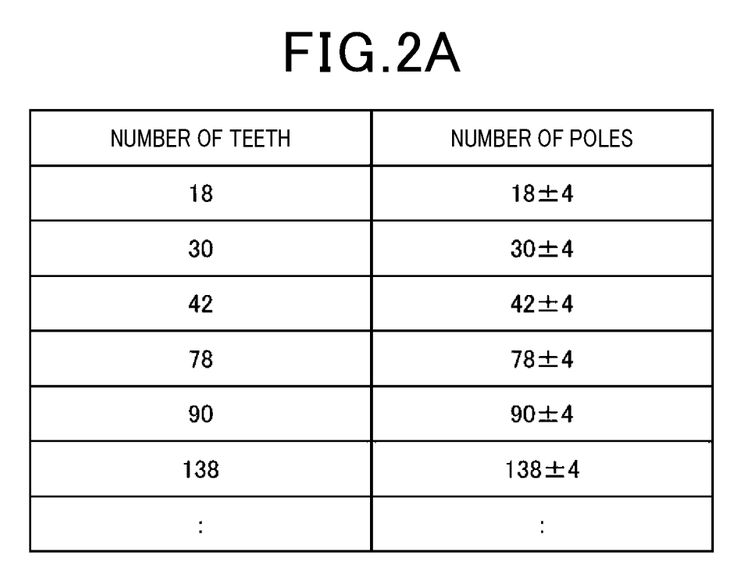
FIGS. 2A and 2B are tables each showing an example of a combination of the number of poles and teeth that accomplishes a rotary electric machine of symmetrical three phase windings based on a design rule with respect to the prime number according to the present embodiment.
Figure 2B:
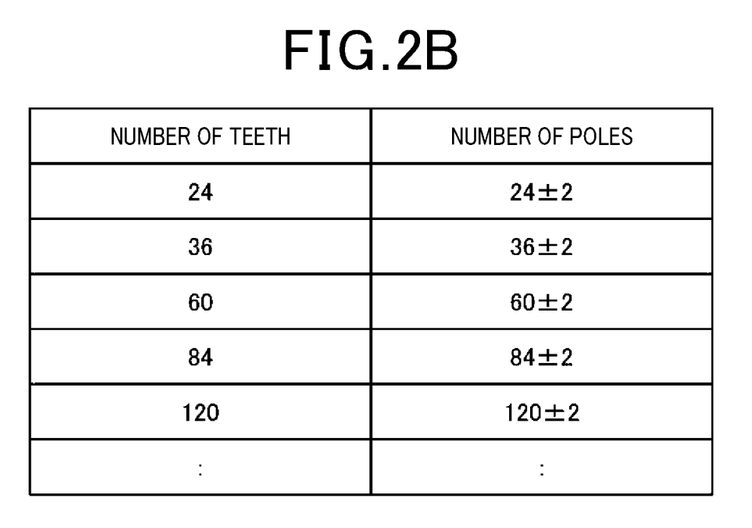

FIGS. 2A and 2B each shows an example of combinations of the number of poles and the teeth which satisfy a synchronous three phase winding of a rotary electric machine in accordance with a design rule with respect to the prime numbers.

FIG. 2A shows the number of poles that satisfies the three phase winding of the rotary electric machine with the number of teeth which is a multiple of 6 (except multiple of 12). FIG. 2B shows the number of teeth that satisfies the three phase winding of the rotary electric machine with the number of teeth which is a multiple of 12. As shown in FIGS. 2A and 2B, for each of cases of 6 multiple and 12 multiple shown in FIGS. 2A and 2B, there is a correlation between respective number of teeth and respective number of poles that satisfies the three phase winding. Specifically, in the case where the number of teeth is a multiple of 6, the number poles is determined by subtracting or adding 4 from/to the number of teeth. Moreover, in the case where the number of teeth is a multiple of 12, the number of poles is determined by subtracting or adding 2 from/to the number of teeth.

The correlation between the number of teeth and the number of poles shown in FIGS. 2A and 2B can be generalized as follows. In the case where the number of teeth is a multiple of 12, the number of poles is 12k±2 (k is 3, 5, 7, 17, for example). In the case where the number of teeth is a multiple of 6, the number of poles is 6m±4 (m is 4, 5, 7, 13, 15, for example).

The above-described design rule of the windings of the rotary electric machine which has been described with reference to FIGS. 1A, 1B, 1C and FIGS. 2A, 2B may be applied to, regardless of the structure of the rotary electric machine, an outer rotor type, an inner rotor type and an axial gap type, or a plural gaps type of those types of rotary electric machines requiring a symmetrical three phase winding.

Next, a detailed configuration according to the rotary electric machine of the present embodiment will be described. An example of an arrangement of a stator 50 having 34 poles and 36 teeth and permanent magnets 60 is shown in FIG. 3.

Since a pitch 10.588 degrees in which one round of the stator is divided by 34 equals to electrically n radian, and an interval between adjacent teeth is 34/36n, that is, 17/18 radian.

Figure 3:
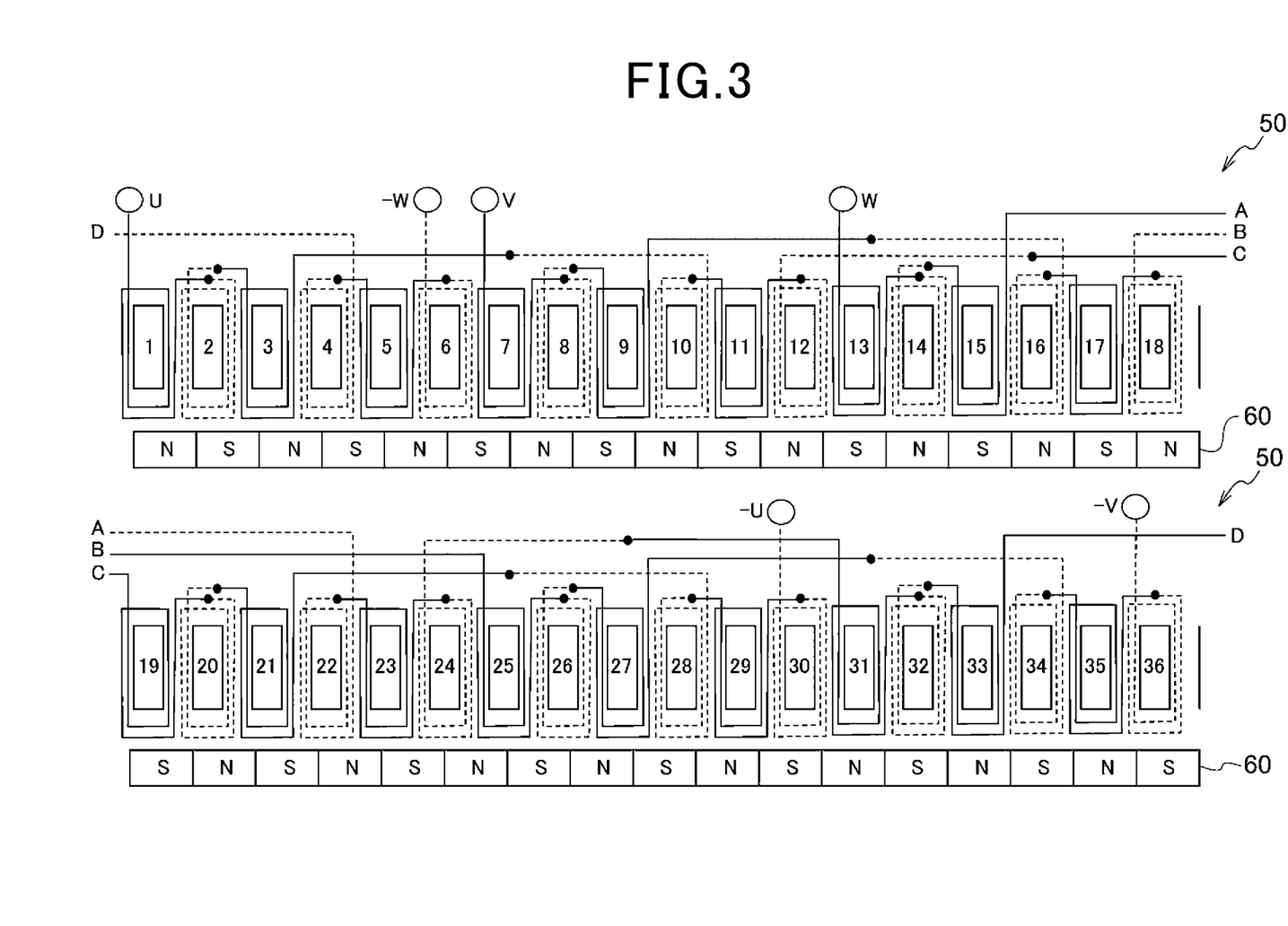
FIG. 3 is an expansion plan view showing an example of an arrangement of permanent magnets and a winding of a stator having 34 poles and 36 teeth in the rotary electric machine according to the present embodiment.

As shown in FIG. 3, sequential numbers are added to respective teeth in order to identify them. The lead wires are wound around respective teeth multiple times, in which the number of turns is the same among the all of teeth. Further, the lead wires are connected such that the energization direction of adjacent windings are in mutually reverse directions. According to the present embodiment, the lead wires are connected such that the energization direction is set to be anti-clock wise direction for the odd numbered teeth, and is set to be clock wise direction for the even numbered teeth.

For the respective teeth shown in FIG. 3, continuous three teeth constitute one phase. Hence, teeth number 1, 2 and 3 constitute the U phase, teeth numbers 4, 5 and 6 constitute an opposite side of the W phase, teeth numbers 7, 8 and 9 constitute the V phase, teeth numbers 10, 11 and 12 constitute an opposite side of the U phase, the teeth numbers 13, 14 and 15 constitute W phase, the teeth numbers 16, 17 and 18 constitute opposite side of the V phase, the teeth numbers 19, 20 and 21 constitute the U phase, the teeth numbers 22, 23 and 24 constitute opposite side of the W phase, the teeth numbers 25, 26 and 27 constitute the V phase, the teeth numbers 28, 29 and 30 constitute opposite side of the U phase, the teeth numbers 31, 32 and 33 constitute the W phase, and the teeth numbers 34, 35 and 36 constitute opposite side of the V phase.

Figure 4:
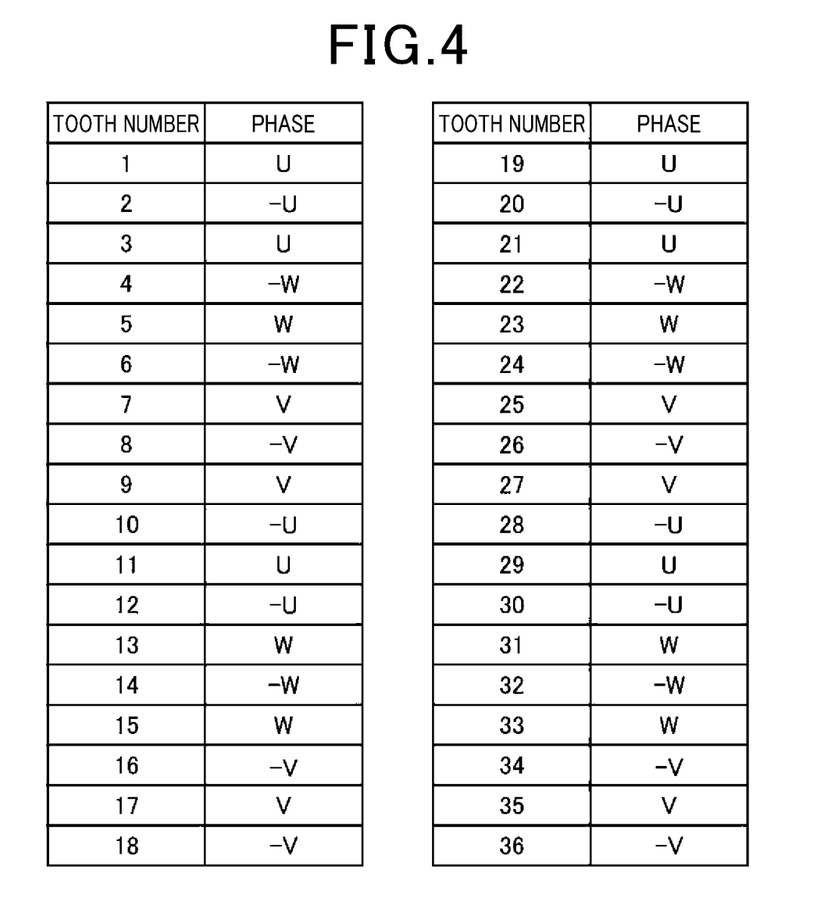
FIG. 4 is a correspondence table showing an example of an arrangement for respective phases in the rotary electric machine having 34 poles and 36 teeth.

Also, since the center winding in the respective three teeth units has a polarity opposite to those of the windings of the both ends, the teeth numbers 1, 2 and 3 correspond to the U phase, −U phase and the U phase respectively. Similarly, the teeth numbers 4, 5 and 6 correspond to −W phase, the W phase and −W phase respectively. A correspondence table for these teeth is shown in FIG. 4

For the respective winding terminals, U, −U, V, −V, W, −W are indicated, and −U terminal, −V terminal and −W terminal are tied together to be a neutral point, thereby producing a symmetrical three phase winding Y-connection. Alternatively, a symmetrical three phase Δ winding may be utilized in which U and −V, V and −W, and W and −U are connected.

As described, since the interval between adjacent teeth is 17/18n as an electrical angle, the interval between the first teeth and the seventh teeth is 6×17/18n=(5+2/3) n, that is, 2/3n pitch. Similarly, since the interval between the first teeth and the thirteenth teeth is 12×17/18n=(10+4/3) n, that is, 4/3n pitch. Accordingly, the U phase is assigned with reference to the first teeth, the V phase is assigned to seventh teeth and the W phase is assigned to thirteenth teeth, thereby producing the symmetrical three phase winding.

Figure 5:
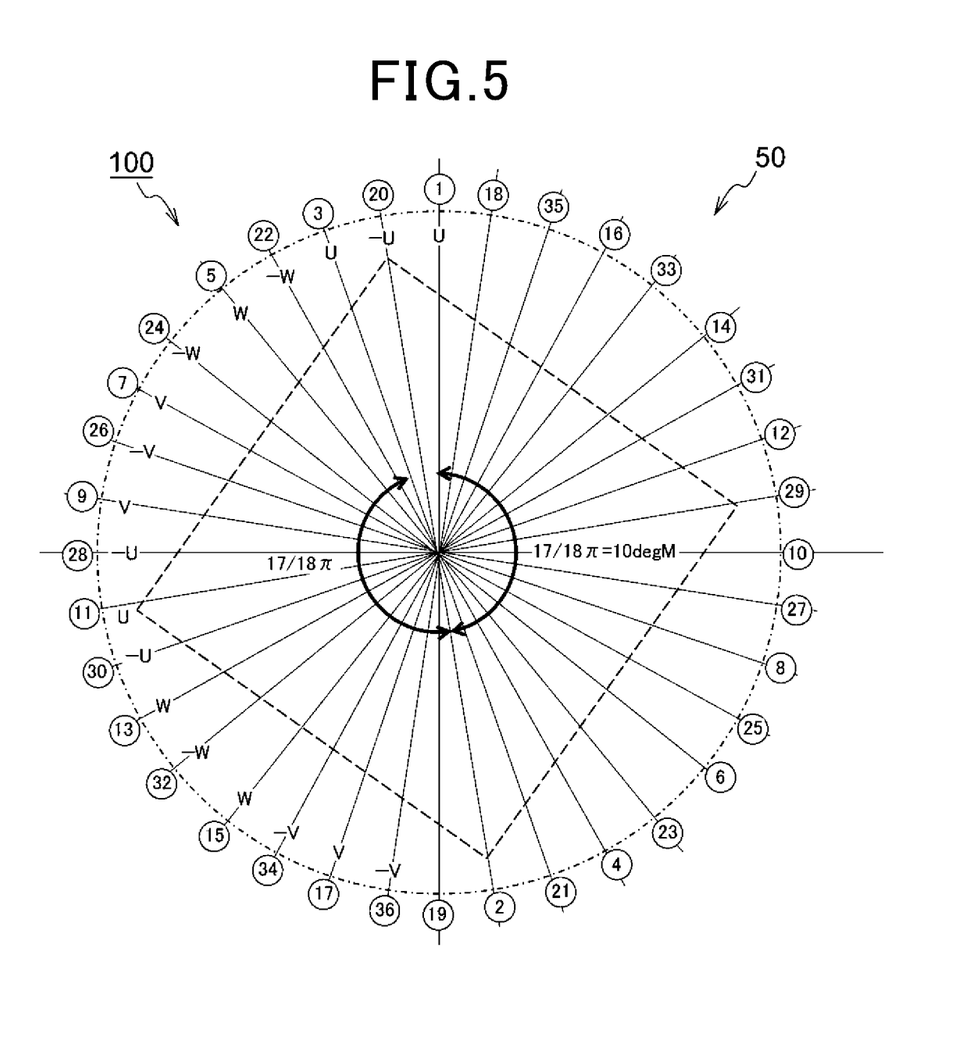
FIG. 5 is an explanatory diagram showing an example of an arrangement for 34 poles and 36 teeth of the stator disposed on a plane orthogonal to a rotary axis of the rotary electric machine according to the present embodiment.

As shown in FIG. 5, according to an arrangement of 34 poles and 36 teeth, since the teeth are arranged circularly, respective teeth are arranged under a condition where one round of the circle (360 degrees) is assigned to 2n radian as one period of the electrical angle. Note that a description "17/18n=10 degM" refers to that the electrical angle 17/18n corresponds to mechanical angle 10 degrees.

The numbers in circles shown in FIG. 5 indicate the teeth numbers shown in FIGS. 3 and 4. In FIG. 5, teeth having adjacent teeth numbers are arranged with an interval of the above-described electrical angle 17/18n. For example, referring to FIG. 1A, in a configuration of 34 poles and 36 teeth, since the interval between adjacent teeth 1 and teeth 2 is 17/18n of electrical angle, as shown in FIG. 5, teeth 2 is arranged at a position that advances in the clock wise direction for 17/18n. Similarly, the teeth 3 is arranged at a position that advances in the clock wise direction for 17/18 n. Thus, respective teeth are subsequently arranged as shown in FIG. 5. When assigning each of the phases to the teeth arranged as shown in FIG. 5, the teeth 20 is arranged between the teeth 1 and the teeth 3. The teeth 20 serves as −U phase, apparently, the teeth 2 serving as −U phase is arranged between the teeth 1 and teeth 2 as the U phase. Therefore, winding sequence is configured over three successive teeth.

Having the symmetrical three phase AC current flow through the above-described three phase winding, an apparent rotational magnetic field having 34 poles can be produced by a mutual interaction of the symmetrical three phase AC current and the arrangement of the magnetic poles of the rotor.

FIG. 3 illustrates an arrangement of windings in real space, while FIG. 5 illustrates an arrangement of the windings in a virtual space. Specifically, for the one having 34 poles, 36 teeth (same as one having 38 poles, 36 teeth), respective pole portions are arranged in equivalent square shapes. For examples, for U phase group, each group, each of the teeth 1, 20, 2, teeth 28, 11, 30, teeth 19, 2, 21, and teeth 10, 29, 12 is arranged in substantially square shape. Assuming that the teeth constituting the U phase group is defined as an apex, lines (diagonal lines of the above-mentioned square) that connect the apexes are substantially and orthogonally crossed with each other. For respective teeth corresponding to the V phase group and the W phase group, similar to the respective teeth corresponding to the U phase group, a substantial square shape is assumed in which teeth constituting respective U phase group and the W phase group are apexes, and lines that connect the apexes are substantially and orthogonally crossed with each other. Accordingly, the rotary electric machine 100 having 34 poles and 36 teeth shown in FIG. 5 is assumed to have substantial square shape in which teeth group in the same phase are apexes, and the lines that connect the apexes in the same phase are substantially and orthogonally crossed with each other.

Since the lines that connect teeth groups in the same phase are substantially and orthogonally crossed with each other, magnetic distortion in the internal spatial magnetic field of the rotary electric machine 100 can be suppressed. Hence, noise caused by the rotary electric machine can be reduced.

Figure 6:
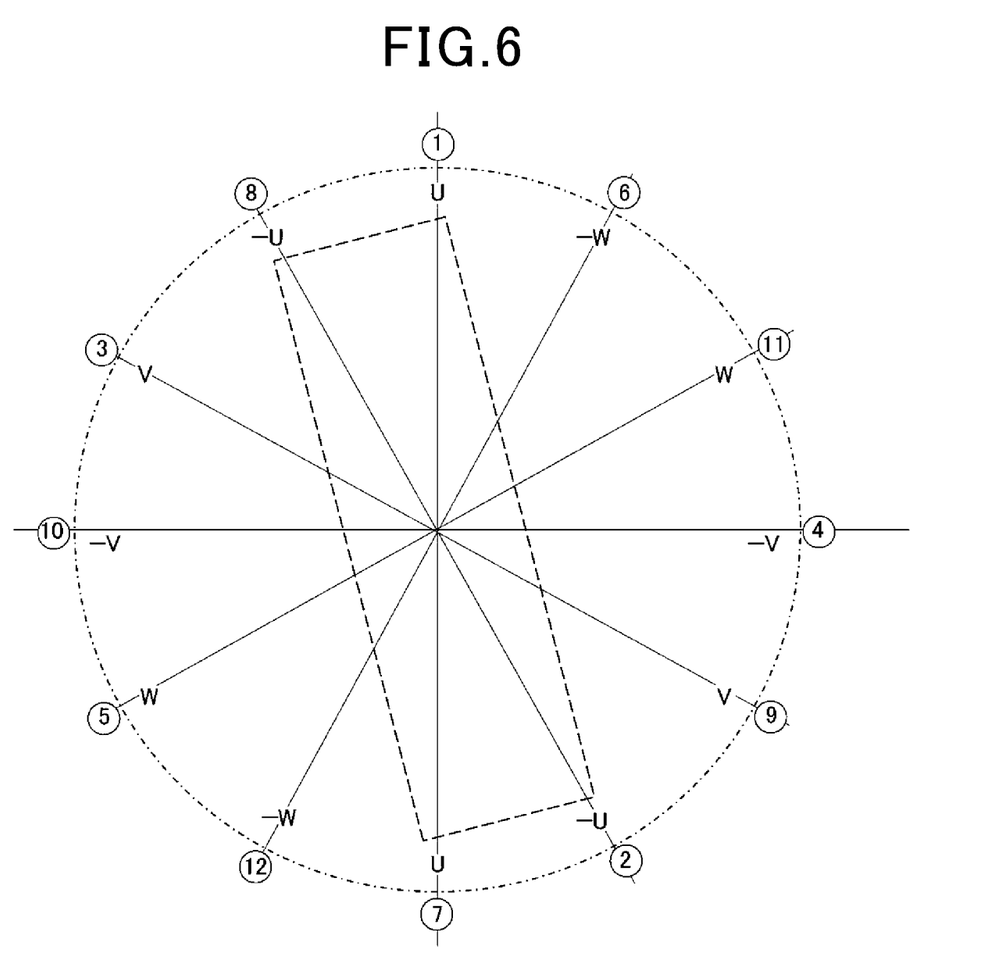
FIG. 6 is an explanatory diagram showing an example of an arrangement of 10 poles and 12 teeth.

FIG. 6 illustrates an arrangement of a stator having 10 poles and 12 teeth. In FIG. 6, the U phase group is arranged in a rectangular shape (teeth 1, 8, 7, 2), and an anisotropic magnetic field is produced in the generated magnetic field. The anisotropic magnetic field in the generated magnetic field may be a cause of noise in the rotary electric machine.

The winding configuration shown in FIG. 5 can be designed regardless of a structure of the rotor of the rotary electric machine 100. For example, the rotor may be configured as an inner rotor type in which the rotor rotates inside the stator, or an outer rotor type in which the rotor rotates outside the stator, or an axial gap type in which the rotor rotates facing the stator in the rotational axis.

The rotor may be configured as a magnet combined type, or a field winding type. An arrangement of the permanent magnets 60 may be arbitrarily designed and may be applied to a Halbach array. Also, the permanent magnets 60 may be of an IPM (Interior Permanent Magnet) type in which the permanent magnets 60 are arranged at a portion close to the center position of the rotary shaft of the rotor.

As described, according to the present embodiment, a rotary electric machine 100 having an optimized combination of the number of poles and teeth can be obtained in accordance with a constant rule which has been found between the number of poles and the number of teeth.

The constant rule present between the number of poles and the number of teeth is defined such that the number of teeth of the concentrated winding stator (50) arranged coaxially to the rotor is set to be a value where an integer S which is multiple of 3 between adjacent prime numbers (P1, P2, P1<P2) in the prime number sequence is multiplied by 2 (2S=P1+P2), and the number of poles of the rotor is set to be a value where a prime number between adjacent prime numbers is multiplied by 2 (2P1, 2P2).

The number of poles when the number of teeth is a multiple of 6 is determined by adding or subtracting 4 from/to the number of teeth. The number of poles when the number of teeth is multiple of 12 is determined by adding or subtracting from/to the number of teeth.

According to the rotary electric machine of the present embodiment, determining process can be simply performed with a clear rule based on the prime number sequence for the combination between the number of poles and the number of teeth, which had been performed with a trial-and error method. As a result, design and development of a rotary electric machine having an optimized combination of the number of poles and teeth can be performed promptly with low cost.

Further, the rotary electric machine 100 according to the present embodiment is able to utilize a configuration having a substantial square shape in which teeth group in the same phase are apexes, and the lines that connect the apexes in the same phase are substantially and orthogonally crossed each other. According to the configuration, since magnetic distortion in the internal spatial magnetic field of the rotary electric machine 100 can be suppressed. Hence, noise caused by the rotary electric machine can be reduced.

CONCLUSION

The rotary electric machine according to the present disclosure has been described.

As a conclusion, the rotary electric machine according to the present disclosure provides a rotary electric machine having an optimized combination of the number of poles and the number of teeth in accordance with a constant rule which have been found between the number of poles and the number of teeth.

The rotary electric machine according to the present disclosure provides a rotary electric machine including: a rotor; and a concentrated winding stator arranged coaxially to the rotor.

The number of teeth of the concentrated winding stator is set to be a value where an integer which is multiple of 3 between adjacent prime numbers in a prime number sequence is multiplied by 2 and the number of poles of the rotor is set to be a value where any prime number between the adjacent prime numbers is multiplied by 2.

According to such a structure, without trial-and-error methods, a rotary electric machine having an optimized combination of the number of poles and teeth can be obtained in accordance with a constant rule which has been found between the number of poles and the number of teeth.

What is claimed is:

1. A rotary electric machine comprising:
a rotor; and
a concentrated winding stator arranged coaxially to the rotor, wherein
the number of teeth of the concentrated winding stator is set to be a value multiplied by 2, the value being an integer that is a multiple of 3, and the integer being between adjacent prime numbers in a prime number sequence,
the number of poles of the rotor is set to be a value equal to one of the adjacent prime numbers multiplied by 2,
the number of teeth is a multiple of 12 and the number of poles is defined as 12k±2, where k is 7 or 17, the number of poles being at least 80, and
a short pitch factor of the concentrated winding stator is in a range of 0.998 to 0.999.

2. The rotary electric machine according to claim 1, wherein the number of teeth is at least 24.

3. The rotary electric machine according to claim 1, wherein the rotary electric machine is configured as an inner rotor type rotary electric machine.

4. The rotary electric machine according to claim 1, wherein the rotary electric machine is configured as an outer rotor type rotary electric machine.

5. The rotary electric machine according to claim 1, wherein the rotary electric machine is configured as an axial gap type rotary electric machine.

6. The rotary electric machine according to claim 1, wherein the rotor includes permanent magnets.

7. The rotary electric machine according to claim 6, wherein the rotor is configured such that the permanent magnets are arranged as a Halbach array.

8. The rotary electric machine according to claim 6, wherein the rotor is configured such that the permanent magnets are arranged at a portion close to a center position of a rotary shaft of the rotor.

9. The rotary electric machine according to claim 1, wherein the rotary electric machine is configured to have a combination of the number of teeth and the number of poles, which is an integral multiple of a combination of the number of teeth and the number of poles selected in claim 1.

* * * * *